June 2, 1970 E. E. G. SNAZELLE 3,515,471

MOTION PICTURE CONSOLE

Filed July 12, 1967 2 Sheets-Sheet 1

INVENTOR.
ERNEST E. GREGG SNAZELLE
BY
Townsend and Townsend
ATTORNEYS

June 2, 1970 E. E. G. SNAZELLE 3,515,471

MOTION PICTURE CONSOLE

Filed July 12, 1967 2 Sheets-Sheet 2

INVENTOR.
ERNEST E. GREGG SNAZELLE

BY

Townsend and Townsend

ATTORNEYS 3,515,471
MOTION PICTURE CONSOLE
Ernest E. Gregg Snazelle, 155 Fell St., San Francisco, Calif. 94102
Filed July 12, 1967, Ser. No. 652,802
Int. Cl. G03b 29/00
U.S. Cl. 352—131 5 Claims

ABSTRACT OF THE DISCLOSURE

A motion picture console and switching mechanism in which a plurality of motion picture cameras are each provided with a television camera viewing system and in which a control console is arranged to simultaneously project the respective images from each of the cameras on the console and which is further arranged to allow the switch of a selective one of the cameras to cause it to be active in a motion picture taking mode while simultaneously projecting the image from the associated television camera at the console.

This invention relates to a switching apparatus for energizing selected ones of a series of motion picture cameras having television camera viewing systems related thereto.

In the taking of motion picture sequences it is often necessary to photograph a single scene from various positions. This is most often done by employing a plurality of cameras each positioned at a different position with respect to the subject. The film from each of the cameras is then cut or spliced together to form chronological continuity with the introduction of cuts to different perspectives of the subject. This has been previously accomplished by photographing the entire sequence by each of the cameras. Thereafter, the film has been edited to a single film in which the editor makes a selection from the plurality of films for each chronological interval to be depicted. This is time consuming, clumsy and involves extremely high costs in editing as well as materials.

In the present invention a control console is employed which in essence independently controls a plurality of motion picture cameras. Each of the motion picture cameras has a television viewer associated therewith, the output of which is projected on the console for the information of the director. By virtue of the controls set out in the console of this invention the director can select any one of the cameras thereby turning the camera on to render it operative in a motion picture taking mode. The subject switching also causes the television image from the viewer to be dually projected on a supplemental television projector. By this means the director can see the subject matter as it is being viewed by each of the cameras whether in an operative mode or not and through the supplementary television projector can see the image as seen by the camera in the operative mode.

The console further operates to allow by push button operation the transfer of the camera in an operative mode to an inoperative condition and another chosen camera to be simultaneously rendered in an operative condition. When this happens, the television image on the supplementary screen shifts to the camera in the operative mode.

A feature and advantage of this invention lies in the fact that the cameras can be sequentially operated from a position in which the director can on the console view the subject matter seen by each of the cameras and can make a selection for the sequential actuation of the cameras to render a series of films which when spliced together in a sequence corresponding to that employed by the director in a shooting session will render continuous chronological continuity. The editing in this event is strictly a mechanical function to be performed by the editor in that the head and the tail end of the film from the respective cameras need merely to be spliced together at film positions corresponding to the time of switchover.

A further feature and advantage of this invention is that only one camera need be operating at any given instance thus limiting the amount of motion picture film shot to an amount equal to that desired in the final film product. This eliminates film wastage.

Another feature and advantage of this invention lies in the fact that the supplementary monitor projects the chronological continuity in accordance with the directors camera selections which exactly equal the film product that will be finally constructed. By this means, the director is able to obtain a more complete visualization of his product and is thus enabled to make wiser and more creative decisions.

Another object of this invention is to provide an interlocking time delay in the switching action in which one camera is turned on and the other camera is turned off by incorporating a delay system in association with the camera that is switched to the inactive mode. This is done to provide a short area of overlapping subject matter between the two switched cameras. This provides the small additional overlapping footage needed to compensate for poor exposures due to less than immediate camera startups and also provides enough footage to create optical effects such as lap-dissolves and the like during the editing process.

The console of the present invention provides in addition a manual switching control which allows additional cameras to be operated in supplement to the camera which is automatically in the operative mode condition. The aforesaid flexibility provides additional footage by which special editing effects can be achieved and enables the director to have a greater control of the camera taking functions.

In a shooting session of the aforesaid character, it is necessary at intervals to change the focal length of the lenses at the respective cameras or to load film. In the present invention, a mechanism has been provided which will prevent a camera from being rendered to the operative condition during the intervals that the lenses are not in their proper position or in which the film is not properly or completely loaded. By the novel mechanism of this invention, should the director switch to the camera which is in such inoperative condition, the console would function to prevent the switching from occurring and would retain the camera previously in the operative mode in its operative condition thus insuring complete motion picture footage from at least one camera during the entire shooting sequence.

Another feature and advantage of this invention lies in the fact that both a motion picture and a television rendition of the photographed event occurs simultaneously and in exact correspondence with each other. This enables both a television recording and a direct motion picture rendition to be recorded simultaneously. This, of course, allows the director to immediately review the sequence by the television recording after the shooting session whereinafter he can call for retakes or modifications of the photographic presentation should there be areas in the television recording which appear to him to be unsatisfactory.

Other objects, features, and advantages of the present invention will be more apparent after referring to the following specification and accompanying drawings in which.

Figure 1:
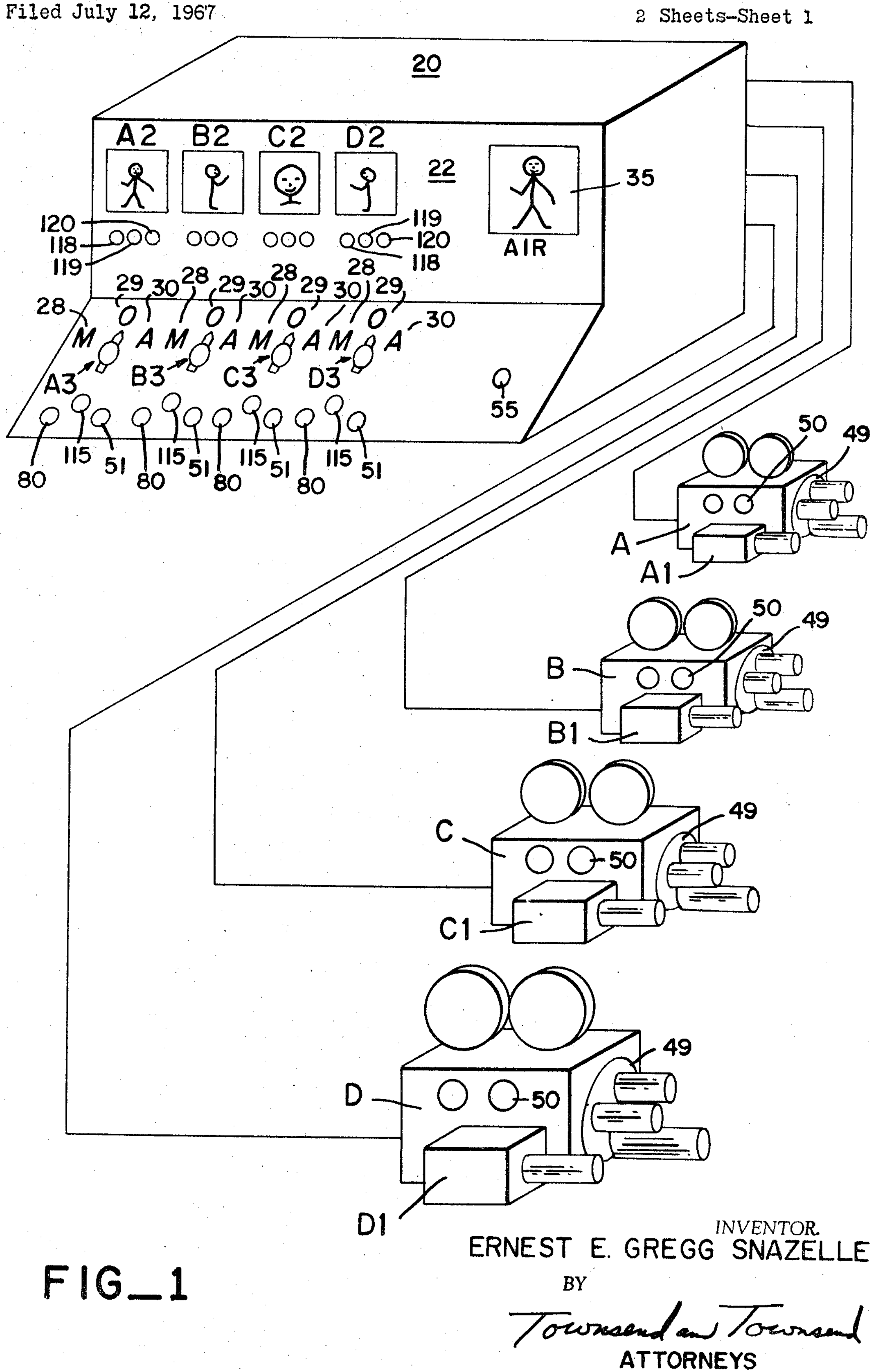
FIG. 1 is a diagrammatic view showing the console with four motion picture cameras and their television cameras attached thereto.

Referring now to the drawings, there is provided a console 20 which is arranged to control four motion picture cameras A, B, C and D. Each of the cameras has a television camera respectively associated with the motion picture camera and indicated at A1, B1, C1 and D1. The television cameras A1 through D1 are arranged with respect to their respective motion picture cameras A through D to generate an image which corresponds to the image being projected to the motion picture film in its associated camera. The respective images are reproduced on four screens A2, B2, C2 and D2 showing on the front panel 22 of console 20. The projection on screen A2 corresponds with the image being produced by the television camera A1 which, of course, is in association with motion picture camera A. Similar correlation exists with the remainder of the cameras B, C and D and their respective television cameras B1, C1 and D1 and their projection screens B2, C2 and D2.

The television cameras A1 through D1 and the reproducing monitors A2 through D2 are of standard television closed circuit design which is well known in the television arts and need not be specifically described in the present description.

Each camera A through D can be arranged by the switching console 20 to be switched in an operative mode by moving switches A3, B3, C3 and D3 to the manual position indicated at 28 and can be rendered in the inoperative position 29 by movement of the respective switches to the off position 29. Automatic operation as will be hereinafter described can be achieved by moving the switches A3 through D3 to the automatic position indicated at 30. When the switches A3 through D3 are in their respective automatic positions at 30, switches A4, B4, C4 and D4 will accomplish a sequential automatic switching of the respective motion picture cameras A through D to the operative and inoperative modes. Under these conditions, the fifth or auxiliary television projector 35 is arranged to duplicate the image corresponding to the image on the monitors A2 through D2 which is received from the television cameras A1 through D1 which is associated with the motion picture cameras A through D which is in the operative mode at any specific instance.

Figure 2:
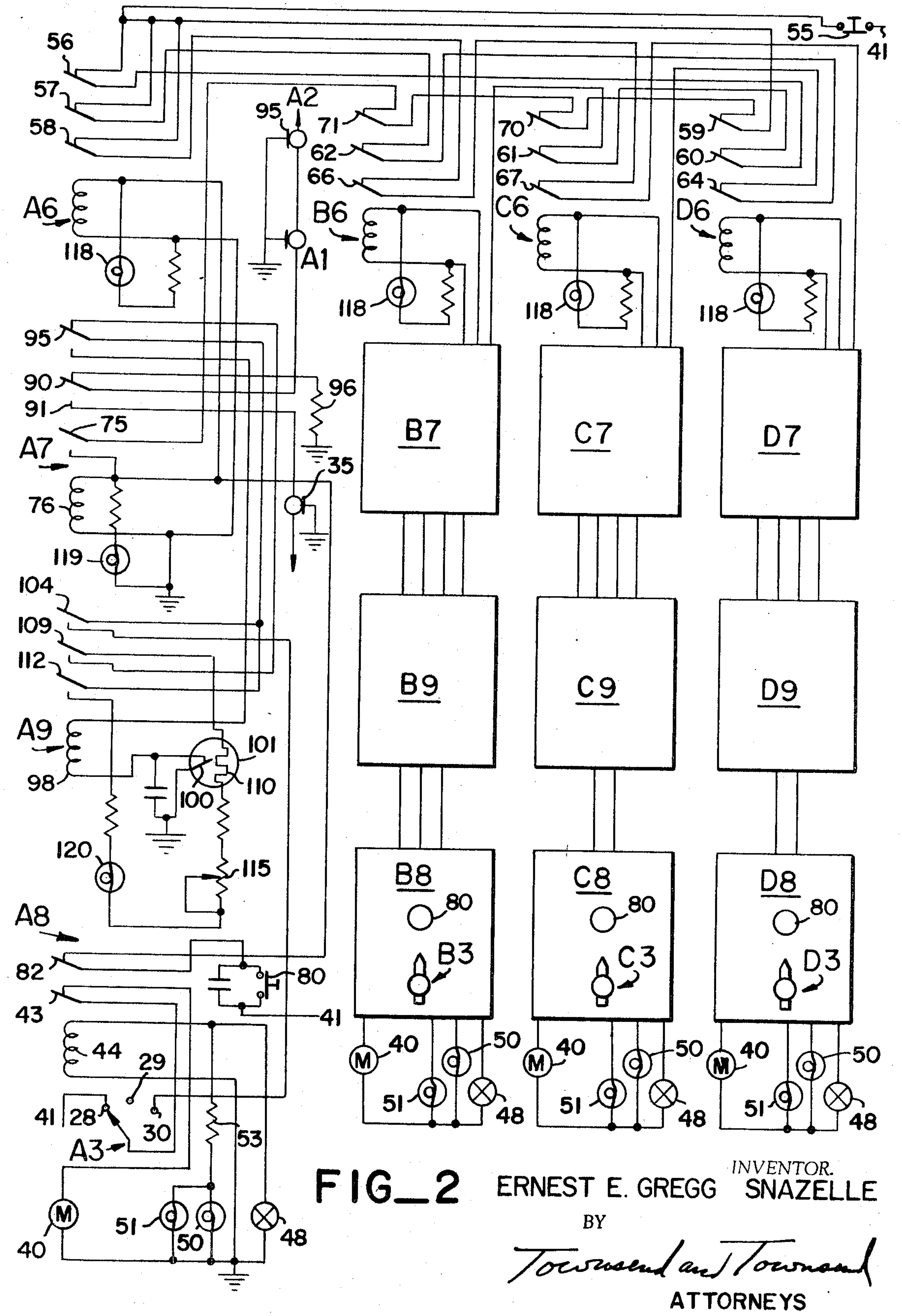
FIG. 2 is a schematic view showing the switching circuitry which accomplishes the functions necessary in the present invention.

The control for the respective cameras is depicted in FIG. 2 in which circuits interrelate and function to specifically control motion picture cameras A through D, television cameras A1 through D1 and monitors A2 through D2 respectively. Each of the four circuits are identical. For purposes of simplicity, except for their interlocking sequential switching function, only one of the complete circuits is shown schematically, the remainder being shown only as blocks, it being understood that the blocks contain elements identical to that shown in the schematic representation.

The drive motor 40 of each camera is connected to the main power source 41 by the respective switches A3, B3, C3 and D3 and when switched to the manual position at 28 transfers the power from power source 41 through relay contact points 43 to the motor. The relay contact points 43 are actuated by a relay 44 which is normally in a deenergized state. Each of the cameras, however, is provided with a switch 48 which is connected to the camera to close when the lens shifting turret 49 of the camera is moved out of picture taking position. The switch is similarly arranged to close when the camera is improperly threaded or loaded. In the condition with switch 48 closed, power from power source 41 is transferred from the switch to the relay 44 which causes relay contact points 43 to open and thereby the breaking of current flow to the camera motor 40. By this mechanism it is insured that the camera can not be operated until it is in a functioning condition.

A light bulb 50 on the camera and a light bulb 51 on the console connected in parallel across relay 44 through a resistor 53 indicates to the camera operator and to the director at the console the inoperative condition of the respective camera. Thus, should any of the cameras A through D be in the inoperative condition, the light bulb 50 of the camera and light bulb 51 on the console illuminated concurrently in this condition informs the director and the camera man that operative power to the camera would be frustrated by the open contact point 43. Otherwise, as can be seen, each and all of the cameras can be rendered operative with the positioning of the respective switches A3 through D3 to the manual position 28. Each of the cameras similarly can be rendered inoperative by the movement of the respective switches A3 through D3 to the off position 29. The cameras can additionally be put in automatic sequence by moving switches A3 through D3 to the automatic position 30.

The automatic sequencing is achieved through sequencing relays A6, B6, C6 and D6. Each of the relays is arranged with three normally closed contact points which will hereinafter be separately numbered in reference to the sequence of switching. Power to the unit through power source line 41 enters the relay circuits A6 through D6 through a main power switch 55 and thence to normally closed contact points 56, 57 and 58 of relay A6 and to relay contact point 59 of relay D6. Relay points 56 are thence connected to relay points 60 of relay D6 and from there are connected to relay contact point 61 of relay C6. Relay points 57 are connected to relay contact points 62 of relay 6B and thence to relay contact points 64 of relay D6. Relay contact points 58 are connected to contact points 66 of relay B6 and thence to relay contact points 67 of relay C6, and relay contact point 59 of relay D6 is connected to relay points 70 of relay C6 and thence to relay points 71 of relay B6. Each of the points above enumerated are in the normally closed position and are arranged to supply power to the video switching circuits A7, B7, C7 and D7 to normally open relay contact points 75 of the video switching relay 76 for each of the respective video switching sections A7 through D7. As can be seen, the relay contact point 75 of relay 76 derives its power through terminals or contact points 71 of relay B6. The same point 75 of video section B7 derives its power through relay points 61. The relay contact points 75 of video switching section C7 derives its power through relay points 64 of relay D6, and, lastly, the same contact points of video section D7 derives power through relay C6. It can thus be seen in the normal condition that power from power supply 41 is supplied to each of the normally open contacts 75 of the respective video switching sections A7 through D7.

Each of the relays A6 through D6 are connected in parallel with the relays 76 of the respective video signal switching stations or circuits. In this condition no one of the cameras would be in an operative condition when all of the switches A3 through D3 are in the automatic position.

To start the sequence of selective actuation of the motion picture cameras A through D, push-button switches 80 in each of the control and rackover circuits A8, B8, C8 and D8 are arranged to supply power from power supply 41 through normally closed relay contact points 82 of relay 44 to relay 76. As has been previously described, relay 44 is in the normally inactive position unless the camera with which the relay is associated is in an inoperative position due to turret movement or film loading. Thus, absent an inoperative condition, the depression of a push-button switch causes the energization of relay 76 and the appropriate relay A6, B6, C6 and D6, as the case may be.

In this condition, normally open relay contact points 75 are latched in a closed position, therefore causing power from one of the contact points of the respective relays A6 through D6 to supply holding current to the relay 76.

As can be seen in the circuit combination for the respective relay points 56 through 71 of the relays A6 through D6, there is a series connection to each of the relay contact points 75 of the video control relays A7 through D7. Thus, when another push-button switch 80 is depressed, there will be an open circuit to the now latched, closed relay point 75, thus causing an unlatching of the relay 76 circuit.

Each relay 76 is connected with a normally closed contact point 90 and a normally open contact point 91. The normally closed contact point is connected to the respective television cameras A1 through D1 at terminal 95 through a load resistor 96. When relay 76 is energized and normally open contact points 91 are in the closed position, the signal from the connected camera is then supplied through contact points 91 to the auxiliary television monitor 35. The respective monitors A2 through D2 are connected in parallel to the television cameras A1 through D1 respectively to enable them to operate separate and apart from the switching operation. Resistor 96 is of an impedance equal to the impedance of auxiliary monitoring view receiver 35 to maintain a constant load on the monitor circuit regardless of whether the circuit is connected or disconnected from the auxiliary monitor 35.

The motion picture cameras A through D are actuated through normally open contact points 95 of each relay 76 which is connected to delay line circuits A9, B9, C9 and D9. The current from normally open contact points 95 is supplied through the solenoid 98 of each delay line A9 through D9 and thence through normally closed contact 100 of a thermal relay 101 thus causing the solenoid 98 to be actuated with the actuation of relay or solenoid 76. This in turn causes the closing of normally open contact points 104 of relay 98 which in turn passes the current to switch contact 30 of the respective switches A3 through D3 which in turn passes the current to motor 40 of the respective motion picture cameras A through D. Thus, as can be seen, when a switch 80 in any of the rackover circuits A8 through D8 is depressed, there will be a latching of the appropriate relays A6 through D6, 76 and 98 to cause the appropriate cameras A through D to be actuated. At the same time, the television cameas A1 through D1 are switched on the auxiliary monitor 35. The switching to another channel as previously described is accomplished by the depression of another switch 80 in a station for another motion picture camera A through D. A delay, however, is effected as will be hereinafter described in order to maintain the latched on camera in a running condition for a predetermined timed interval to thus maintain a predetermined amount of overlapping time for each switchover. This function is accomplished through the delay relay 101 which is provided with the normally closed contact points 100.

As can be seen, when relay 76 is unlatched, normally open relay contact points 95 are again opened and its reverse points 108 are closed. This causes current to flow through contact points 109 of relay A9 through D9 respectively through the terminal element 110 of terminal relay 101. In the meantime, relays A9 through D9 respectively have been latched on by normally open relay contact points 112. The heat therein caused in relay 101 eventually causes relay points 100 to open, thus causing relay 98 to resume to its open or unenergized position. As this happens, the attached camera A through D is turned off.

The length of delay is determined by a variable resistor 115 whereby the length of delay can be regulated; such is shown on the control console of FIG. 1 at 115.

The condition of each of the relays in their energized condition is indicated on control panels by lights, A6 through D6 by a light 118, relay 76 by a light 119 and relay 98 by a light 120. This enables the operator to see the condition of the circuit in operation.

To go through a specific sequence of operation, it can be assumed that motion picture camera A is in the on position. Upon the depression of the switch 80 for motion picture camera B, the relay 76 of video control circuit B7 and the relay B6 are latched in the closed position. This among other things causes the opening of contact points 71 of relay B6 which cuts the current flow to relay 76 of video switching circuit A7 and relay A6. In this condition, the television signal from television camera A1 to television monitor 35 is broken and simultaneously the signal from television camera B1 is supplied to monitor 35 through the television switching circuit B7. At the same time, current through relay contact points 95 energize the heater 110 of delay line A9 and after a predetermined time cause its contact points 100 to open thereby releasing the operative current to motion picture camera A. Of course, immediately upon depression of the switch 80 for camera B, camera B was turned on. Thus, there has been an overlap in the running time between the two cameras, camera B being turned on immediately and camera A being turned off in accordance with the delay effected by the delay circuit A9. Had the rackover relay B8 been in an inoperative position, no switching action would have occured due to the open condition of its contact points 82. It can thus be seen that in this device the director has an immediate crossover on television monitor 35 of the image that is currently being photographed and can shift the picture taking operation to any one of the attached motion picture cameras A through D and maintain constant television monitoring of the active channel thereon. Simultaneously, of course, the image from each of the cameras is duplicated on the monitors A2 through D2.

While one embodiment of this invention has been shown and described, it will be apparent that other adaptations and modifications can be made without departing from the true spirit and scope of the invention.

What is claimed:

1. A motion picture camera switching and control device for selectively activating a plurality of motion picture cameras comprising: a television camera mounted adjacent each said motion picture camera adapted to form a television image approximately the field of view delivered to the motion picture camera near to which the television camera is positioned, a console having a plurality of first television receivers, said first television receivers each being individually connected to one of said television cameras to display the images formed thereby, switch means mounted on said console for selectively energizing and deenergizing each of said motion picture cameras independently of the others, sequencing switch means mounted within said console and connected to said switch means to actuate selected ones of said motion picture cameras, and means connected to said sequencing switch means to deactivate other of said motion picture cameras upon said sequencing switch means being actuated to actuate a selected motion picture camera, a second television receiver mounted on said console and means actuated by said sequencing switch means to cause the image from the television camera mounted adjacent the selected motion picture camera to be connected for display on said second television receiver, said sequencing switch means including a switch, a relay actuated by said switch and means to hold said relay in a latched condition when actuated, and wherein said means connected to said sequencing switch to deactivate the other of said motion picture cameras comprises second relay means having a plurality of series connected contact points adapted to deenergize said latching means.

2. A motion picture camera switching and control device according to claim 1 and wherein said switch means is connected to actuate selected motion picture cameras in a first position dependent upon said sequencing switch means and in a second position independent of said sequencing switch means.

3. A motion picture camera switching and control device according to claim 1 and wherein each of said cameras has mounted thereon a circuit breaker means operative to deactivate said camera from the control of said switch means and said sequencing switch means, and means mounted on said motion picture camera to operate said circuit breaker means when said camera is in a condition unacceptable for the taking of motion pictures if actuated.

4. A motion picture camera switching and control device for selectively activating a plurality of motion picture cameras comprising: a television camera mounted adjacent each said motion picture camera adapted to form a television image approximating the field of view delivered to the motion picture camera near to which the television camera is positioned, first television receiver means connected to project the image formed by each of said television cameras, switch means connected to cause a selected one of said motion picture cameras to be in the operative condition, the remainder of said motion picture cameras to be in the inoperative condition, second television receiver means and means actuated by said switch means to cause said second television receiver means to display the image created by the television camera adjacent to the selected operative motion picture camera and delay means connected between said switching means and said motion picture cameras connected to delay the deactivation of an actuated motion picture camera a predetermined time interval when another motion picture camera is activated by said switch means to be in the operative condition.

5. A motion picture camera switching and control device according to claim 4 and wherein said delay means is connected to be operative independently of said switch means connected to said second television receiver means.

References Cited

UNITED STATES PATENTS

| | | | |
|---|---|---|---|
| 2,928,311 | 3/1960 | Strauss | 352—131 X |
| 3,224,829 | 12/1965 | Forster | 352—131 |

JOHN M. HORAN, Primary Examiner